United States Patent Office 3,146,211
Patented Aug. 25, 1964

3,146,211
AROMATICALLY UNSATURATED POLYMERS
AND PREPARATION THEREOF
Louis A. Errede, St. Paul, Minn., assignor to Minnesota Mining and Manufacturing Company, St. Paul, Minn., a corporation of Delaware
No Drawing. Filed Jan. 26, 1959, Ser. No. 788,736
1 Claim. (Cl. 260—2)

This invention relates to a process for the preparation of novel and useful polymers of improved properties and to the products produced thereby. In one aspect this invention relates to the preparation of novel and improved polymers containing recurring aromatically unsaturated nuclei. In another aspect, this invention relates to novel polymers containing recurring aromatically unsaturated nuclei which polymers have improved molding properties and are selectively soluble in common organic solvents.

It is known that certain polymers containing aromatically unsaturated nuclei such as poly-p-xylylene have certain desirable properties which make them valuable as electrical insulators and as protective coatings and that they possess a high degree of thermal and chemical stability. Polymers such as poly-p-xylylene at the present are capable of being molded only at very high temperatures such as between about 350° C. and about 450° C. and the molded products thereby obtained are rigid materials. Such polymers are known to be insoluble in most common organic solvents and thus when it is desired to apply them as protective coatings, special techniques and high temperatures must be used to obtain a continuous coating of the polymer.

It is an object of the present invention to provide new and valuable polymers of improved properties.

Another object of this invention is to provide new and valuable polymers containing recurring aromatically unsaturated nuclei which polymers can be molded into a variety of useful end products at relatively low temperatures.

Another object is to provide a new and valuable polymer which can be applied to various surfaces as a protective coating by conventional coating techniques such as the spray technique.

Another object is to provide a process for the production of polymers containing recurring aromatic nuclei.

A further object is to provide a method for the preparation of a novel high polymer of improved molding properties which is characterized by the maximum utilization of the starting material and minimum formation of undesirable by-products.

Various other objects and advantages of the present invention will become apparent to those skilled in the art from the accompanying description and disclosure.

It has been discovered that quinodimethane reacts with phosphorus compounds to produce a phosphorus-containing polymer having recurring aromatically unsaturated nuclei. Compounds of the other normally solid elements in Group V, sub-group B of the periodic chart having a molecular weight greater than 30, such as arsenic, are useful and contemplated as being within the scope of this invention. Each of these elements have valence states of 3 and 5 analogous to phosphorus compounds which because of their availability and ease of handling are preferred and have been given priority in the developmental aspects of this invention. Accordingly, this invention has been discussed with particular reference to phosphorus compounds and polymers but where applicable other elements of this series may be substituted for phosphorus.

The term "quinodimethane" as used herein means an organic compound having a diunsaturated six-membered cyclic nucleus having each of two carbon atoms of the diunsaturated ring doubly bonded to the carbon atom of a methylene group.

The phosphorus-containing reactant includes both the inorganic and organic phosphorus compounds and is preferably an inorganic or organic trivalent phosphorus halide.

Generally speaking, the process is conducted at a temperature below 50° C. and usually at a temperature below 30° C., and preferably at a temperature below —45° C.

Illustrative phosphorus polymers of this invention are those containing one or more of the radicals; —PX$_3$—,

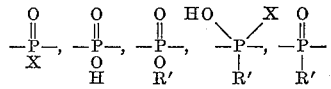

—PX$_2$R'—, —PXR'$_2$—, —PR'$_3$—, and —P(OR')$_3$—
where X is a halogen and R' is a hydrocarbyl radical, i.e., the radical formed by removing a hydrogen atom from any hydrocarbon.

One type of phosphorus-containing polymer produced according to this invention in the presence of oxygen or water either during the polymerization or subsequent thereto may be represented by the following general formula:

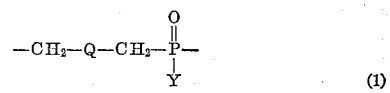
(1)

wherein Q is an aromatically unsaturated nucleus having the same cyclic skeleton as the quinodimethane reactant employed and wherein Y is derived from the phosphorus-containing reactant and is a member of the group consisting of hydrogen, halogen, alkyl, aryl, aralkyl, cycloalkyl, alkoxy, and aryloxy radicals. The physical nature of such polymers ranges from low molecular materials such as oils, greases and low melting waxes to higher molecular weight materials including both elastomers and thermoplastics. The novel polymers of this invention are non-inflammable materials having good adhesion properties to rough as well as smooth surfaces, and are particularly useful as intermediates in the formation of other novel and valuable phosphorus-containing polymers, and as protective coatings and impregnating agents thereby rendering the surface to which they are applied resistant to chemical attack by strong and corrosive chemicals such as concentrated sulfuric acid.

As indicated above, the quinodimethane starting material contains a diunsaturated six-membered cyclic nucleus having each of two carbon atoms of the ring doubly bonded to the carbon atom of a methylene group which methylene group may be substituted or unsubstituted. The diunsaturated ring which is common to each of the quinodimethanes used as a monomer in the process of this invention is referred to herein as the quinoid ring. Although the two methylene groups which are doubly bonded to the quinoid ring may be bonded to adjacent, i.e. ortho-positioned, carbon atoms of the ring, they are preferably bonded to carbon atoms of the ring which are in the para, or 1 and 4, position to one another. The preferred quinodimethanes of this invention are those having a symmetrically diunsaturated six-membered ring to which a methylene group is doubly bonded to each of two para-positioned carbon atoms of the quinoid ring. The term quinodimethane as used herein includes those compounds which contain only the one quinoid ring such as, for example, in p-quinodimethane which has the structure:

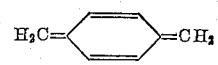

as well as those compounds in which the quinoid ring is fused to one or more aromatically unsaturated six-membered rings such as, for example, in 1,4-naphthaquinodimethane which has the structure:

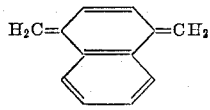

The aromatically unsaturated ring which is fused to the quinoid ring is referred to herein as the benzenoid ring.

It is to be understood that the quinodimethane starting material of this invention may be a carbocyclic compound, i.e. a cyclic compound in which each atom of the cyclic skeleton is a carbon atom such as in p-quinodimethane and 1,4-naphthaquinodimethane; or it may be a nitrogen-containing heterocyclic compound, i.e. a compound having at least one nitrogen atom as part of the cyclic skeleton. The heterocyclic compounds are preferably those in which the nitrogen is vicinal only to carbon and include those in which nitrogen is a constituent of the quinoid ring or the benzenoid ring.

The groups which are singly bonded to the cyclic skeleton of the quinodimethane are referred to herein as the nuclear substitutents and may be hydrogen, halogen, alkyl, aryl, alkoxy, or aryloxy radicals. These substituents of the dicyclic compounds may be the same or different, and may be on the quinoid ring or on the benzenoid ring or on both rings. The methylene groups which are doubly bonded to the quinodimethane ring may be unsubstituted methylene groups, i.e. ($CH_2=$), or they may be substituted with halogen, alkyl, aryl, aralkyl, alkoxy, and aryloxy groups without departing from the scope of this invention.

The preferred quinodimethanes which are reacted with the phosphorus-containing compound and oxygen as described herein are those of the group consisting of p-quinodimethane, 1,4-naphthaquinodimethane, and corresponding heterocyclic quinodimethanes containing at least one heteronitrogen atom vicinal only to carbon atoms and the nuclear substitution products of the foregoing members with atoms of the normally gaseous halogens and methyl groups.

The preferred quinodimethane starting material which is reacted in accordance with the present invention is prepared by pyrolyzing an aromatic compound of the group consisting of p-xylene, 1,4-dimethylnaphthalene, corresponding heterocyclic dimethyl compounds having from 1 to 2 six-membered rings and containing at least one heteronitrogen which is vicinal only to carbon atoms, and the nuclear substitution products of the foregoing members with atoms of the normally gaseous halogens and additional methyl groups at a temperature between about 700° C. and 1300° C. and at a total pressure not higher than about 400 mm. mercury for a period of not more than one second followed by quenching of the pyrolyzed vapors in a cold liquid to a temperature which is preferably below about −45° C.

Among the specific carbocyclic aromatic compounds which can be pyrolyzed to produce the aforesaid quinodimethanes which are used as a reactant in accordance with the process of this invention are: p-xylene; pseudocumene; durene; isodurene; prehnitene; pentamethyl benzene; hexamethyl benzene; 1,4-dimethyl naphthalene; 1,2,3,4,6,7-hexamethyl naphthalene; 2-chloro-p-xylene; 2-fluoro-p-xylene; 2,5-difluoro-xylene; 2,5-dichloro-p-xylene; 2,3,5-trichloro-p-xylene; 2,3,5-trifluoro-p-xylene; 2,3,5,6-tetrachloro-p-xylene; 2,3,5,6-tetrafluoro-p-xylene; 2-chloro-3,5,6-trimethyl benzene; 6-chloro-1,4-dimethyl naphthalene; and 2,3,6,7-tetrachloro-1,4-dimethyl naphthalene. Among the specific aromatically unsaturated nitrogen-containing heterocyclic compounds which are pyrolyzed to yield the heterocyclic quinodimethanes which are reacted as described herein are: 2,5-dimethyl pyrazine; 2,5-lutidine; 2,5-dimethyl pyrimidine; 5,8-dimethyl quinoline; 1,4-dimethyl isoquinoline; 5,8-dimethyl isoquinoline; 5,8-dimethyl quinazoline; 5,8-dimethyl quinoxaline; 2,3,5-trimethyl pyrazine; 2,3,5,6-tetramethyl pyrazine; 2,3,5-trimethyl pyridine; 2,4,5-trimethyl pyridine; 5,6,8-trimethyl quinoline; and 2,5-dimethyl-6-chloropyrazine.

The pyrolysis of the aforesaid 1,4-dimethyl substituted aromatic compounds is preferably carried out at a temperature within the range of about 900° C. to about 1300° C., for example, at about 1000° C. For best results the aromatic vapor should be present at a partial pressure substantially not higher than 150 mm. mercury. Excellent results are obtained when the partial pressure of the 1,4-dimethyl substituted aromatic compound is 10 mm. mercury or somewhat below, for example, about 5 mm. mercury. The pyrolysis can be conducted in the presence of an inert gas, such as carbon dioxide, steam or nitrogen, particularly when the partial pressure of the aromatic compound is 10 mm. mercury or below. In all cases the total pressure employed should be below 400 mm. mercury. Within the preferred pyrolysis temperature range the contact time should be within the range of from about 0.1 to about 0.001 second.

The quinodimethanes thus formed tend to homopolymerize very quickly when in the vapor phase or in solution at a temperature above about −45° C. It has been found that in the absence of a polymerization initiator the quinodimethanes do not homopolymerize rapidly at a temperature below about −45° C. The hot vapor of quinodimethane produced by the above pyrolysis reaction is quenched rapidly, therefore, in a liquid maintained at a relatively low temperature which is preferably below −45° C. The temperature at which the hot vapors are quenched depends largely on whether or not the quinodimethane thereby produced is to be stored over an extended period of time or whether the quinodimethane is to be used immediately as a monomer in accordance with the process of this invention. This is an important consideration since, as indicated above, it has been found that the quinodimethanes form homopolymeric products at about room temperature and, in fact, they homopolymerize rapidly at temperatures above about −45° C. Thus, when it is desired to store the quinodimethane in stable form until it is to be reacted as described herein, the hot vapor obtained by the pyrolysis reaction is quickly quenched in a cold liquid maintained at a temperature below about −45° C. and preferably at about −80° C. or below. The solution thus prepared is stored under nitrogen until ready for use.

The liquid used for quenching and storing of the quinodimethane may be of any composition which remains liquid at the necessary temperature range and which has a relatively low partial pressure at about −45° C. consistent with the upper total pressure limit of 400 mm. mercury pressure and preferably low enough to permit operation below 10 mm. mercury pressure. The liquid also should be substantially non-reactive with the quinodimethane formed, although liquids which react to some slight degree may be used. Among the specific liquids which may be used for quenching are the paraffinic and cycloparaffinic hydrocarbons of low freezing point, such as hexane, petroleum ether, cyclopentane and 1,4-dimethyl cyclohexane; the aromatic hydrocarbons of low freezing point, such as toluene, ethyl benzene, o-ethyl toluene and m-diethyl benzene; the halogenated hydrocarbons of low freezing point, such as o-chloroethyl benzene, o-fluoro toluene and 1,1-dichloroethane; carbonyl compounds of low freezing point such as acetone, methyl ethyl ketone and methyl isobutyl ketone; ethers of low freezing point, such as diethyl ether, ethyl n-propyl ether and tetrahydrofurane; alcohols of low freezing point, such as methanol, ethanol and isopropyl alcohol; and other normally liquid compounds of low freezing point, such as carbon disulfide. If desired, liquids of low freezing point may be obtained by the blending of two or more compounds of higher freezing point. For example, mixtures of carbon tetrachloride and chloroform may be used.

A more detailed description concerning the preparation of the quinodimethane used in accordance with the present invention can be found in U.S. Patent No. 2,777,005.

As indicated above, the quinodimethane and phosphorus-containing compound are interacted in the presence or absence of oxygen to produce novel phosphorus-containing polymers. When oxygen is employed during the polymerization process, the reaction is accelerated. The preferred source of oxygen is air but other forms of gaseous oxygen such as pure oxygen and commercial oxygen may be used. The oxygen may be introduced into the reaction zone in admixture with a diluent gas such as nitrogen without departing from the scope of this invention.

As indicated above, the phosphorus-containing compound which is interacted with the quinodimethane as described herein may be an inorganic phosphorus compound or an organic phosphorus compound and includes those compounds in which phosphorus is trivalent or pentavalent which produce phosphorus containing polymers. In each of these compounds phosphorus is bonded to at least one member of the group consisting of hydrogen, halogen, oxygen, and carbon atoms. The inorganic phosphorus-containing compounds include phosphine ($PH_3$); the trivalent phosphorus halides ($PX_3$); and pentavalent phosphorus halides ($PX_5$) in which X is any of the halogens and may be the same or different.

Typical examples of the inorganic trivalent and pentavalent phosphorus halides to be employed are as follows: phosphorus trifluoride, phosphorus trichloride, phosphorus tribromide, phosphorus triiodide, phosphorus pentachloride, phosphorus pentabromide, and the mixed halides such as difluoro phosphorus chloride, difluoro phosphorus iodide, dichloro phosphorus fluoride, dichloro phosphorus bromide, and trichloro phosphorus dibromide. Among the other suitable inorganic phosphorus compounds to be included are phosphine; and the phosphoryl trihalides such as phosphoryl fluoride, phosphoryl chloride, phosphoryl bromide, and the mixed phosphoryl trihalides such as bromo phosphoryl dichloride, dichloro phosphoryl fluoride and iodo phosphoryl dichloride, especially in the preparation of phosphorus containing telomers. Of the inorganic phosphorus-containing compounds which are employed the trivalent phosphorus halides such as phosphorus trichloride are preferred.

The organic phosphorus-containing reactants to be employed are those having at least one carbon atom of an organic radical either bonded directly to phosphorus to form a carbon-to-phosphorus bond, or bonded to phosphorus through an atom of oxygen to form a carbon-to-oxygen-to-phosphorus bond. The organic radical or radicals may contain from 1 to about 12 carbon atoms and preferably contain from 1 to about 8 carbon atoms per radical, and where there is more than one organic radical, they may be the same or different. The preferred organic phosphorus-containing compounds to be employed are those in which phosphorus is trivalent such as in the primary, secondary, and tertiary phosphines, i.e., $RPH_2$, $R_2PH$ and $R_3P$; the organic trivalent phosphorus monohalides and dihalides, i.e., $R_2PX$ and $RPX_2$; organic phosphonyl halides, i.e., $RP(O)X_2$; and the esters of a polybasic oxy-acid of trivalent phosphorus, i.e., $(RO)_3P$, $RP(OR)_2$ and $(RO)_2POM$ wherein R in each of the aforesaid formulas is an organic radical which is preferably selected from the group consisting of the alkyl, aryl, aralkyl, and cycloalkyl radicals; X is any of the halogens; and M is an alkali metal. The organic radical (R) is preferably one which is free of aliphatic unsaturation and may be an unsubstituted hydrocarbon radical or a substituted hydrocarbon radical such as those having nitro, halogen and hydroxyl groups as substituents.

Typical examples of suitable organic phosphines which may be employed are as follows: methyl phosphine, ethyl phosphine, phenyl phosphine, dimethyl phosphine, diphenyl phosphine, triethyl phosphine, diethyl methyl phosphine, triphenyl phosphine and propyl phenyl phosphine. Typical examples of the organic trivalent phosphorus halides to be employed are methyl phosphorus dichloride, ethyl phosphorus difluoride, isopropyl phosphorus dichloride, benzyl phosphorus dichloride, phenyl phosphorus diiodide, diphenyl phosphorus chloride, 4-nitro-phenyl phosphorus dibromide, 4-bromophenyl phosphorus dichloride, methyl ethyl phosphorus chloride, diethyl phosphorus bromide, dibenzyl phosphorus fluoride, cyclohexyl phosphorus dichloride, cyclopentyl phosphorus dibromide, beta-chlorooctyl phosphorus dichloride, and cyclohexyl bromophosphorus chloride.

Typical examples of the organic phosphonyl halides which may be employed are the unsubstituted and substituted hydrocarbon phosphonyl halides such as alkyl, cycloalkyl, and aromatic phosphonyl halides, preferably having less than 8 carbon atoms per molecule. Typical examples of such compounds are: methane phosphonyl dichloride, methoxy methane phosphonyl dichloride, 4-methylphenyl phosphonyl chlorobromide, cyclopentane phosphonyl difluoride, cyclohexane phosphonyl dichloride, diethyl phosphonyl chloride, benzyl phosphonyl dichloride, benzene phosphonyl dichloride, 4-methylbenzene phosphonyl dibromide and 2-ethylbenzene phosphonyl dichloride.

The esters of the polybasic oxy-acids to be employed are preferably those of trivalent phosphorus such as esters of phosphorus and phosphonous acids, i.e., the phosphites and phosphonites. Typical examples of these compounds are the trialkyl phosphites such as trimethyl phosphite, triisopropyl phosphite, tributyl phosphite, tri-2-ethylhexyl phosphite, and tridodecyl phosphite; dialkyl aryl phosphites and phosphonites such as dibutyl phenyl phosphite, diethyl phenyl phosphite, dipentyl phenyl phosphite, dibutyl benzenephosphonite and dipropyl benzene phosphonite; triaryl phosphites such as triphenyl phosphite; aralkyl phosphites and phosphonites such as dibutyl benzyl phosphite and dibenzyl benzenephosphonite; cycloalkyl phosphites and phosphonites such as dibutyl cyclopentane phosphonite; and the alkali metal dialkyl phosphites such as sodium diethyl phosphite and potassium ethyl butyl phosphite.

Of the aforesaid phosphorus-containing compounds which may be employed, the inorganic and organic phosphorus halides having the above-defined formulas, $PX_3$, $PX_5$, $R_2PX$, and $RPX_2$ wherein R is an organic radical having not more than 8 carbon atoms and wherein X is a normally gaseous halogen such as fluorine and chlorine are preferred.

The particular phosphorus-containing compound which is employed will depend upon the ultimate product desired. Thus, for example, when it is desired to produce polymers having a halogen bonded to the phosphonyl groups such as those having the phosphonyl halide group

the inorganic phosphorus trihalides and pentahalides, are preferably employed. When it is desired to produce polymers having the carbon atom of an organic radical bonded to the phosphonyl group such as those having the unit

the organic phosphines and phosphonites are preferably employed. Further, when it is desired to produce polymers having the unit

the phosphites are preferably employed. It is to be understood that the two residual valences of the phosphonyl group of each of the above-indicated recurring units are involved in phosphorus to carbon bonds and make up the backbone of the polymer chain.

General reactions involved in the production of the novel phosphorus-containing polymers according to this invention can be illustrated by the following reactions wherein p-quinodimethane (p-xylylene) is used as a representative example of the quinodimethanes which are to be employed.

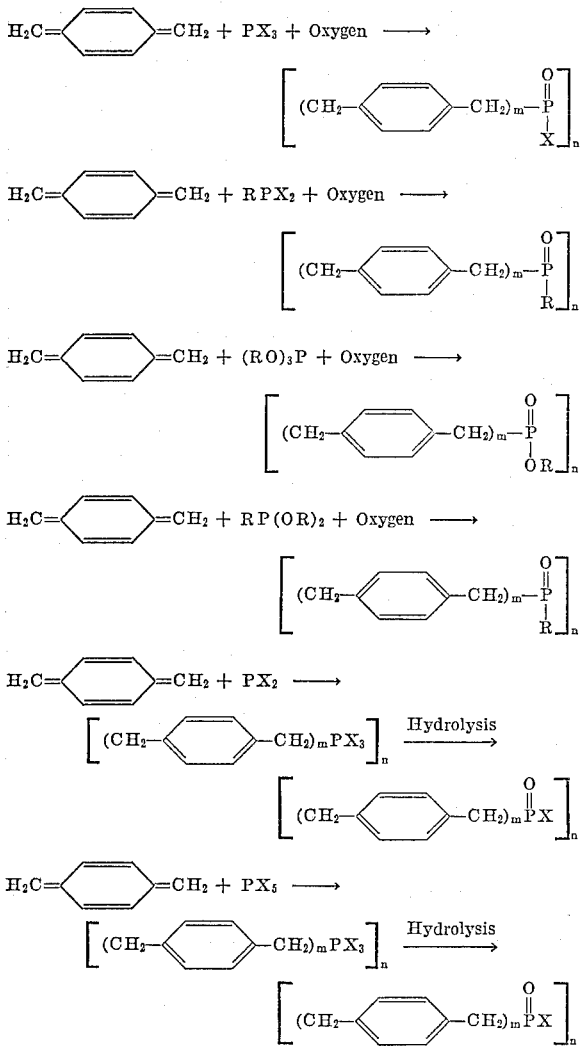

wherein $m$ is an integer from 1 to 1000, preferably 1 to 10 and $n$ is an integer from 1 to about 10,000; R is an organic radical having a continuous carbon skeleton and preferably not more than 8 carbon atoms; and X is a halogen. As previously indicated in discussing the organic radicals of the organic phosphorus-containing reactants, R is preferably a substituted or unsubstituted alkyl, aralkyl, cycloalkyl, or aryl radical. Although X may be any of the halogens (i.e., F, Cl, Br and I) without departing from the scope of this invention, X is preferably a gaseous halogen, such as fluorine and chlorine.

The elements of the quinodimethane remain substantially unchanged when reacted as described herein, except that the diunsaturation of the quinoid ring is rearranged to aromatic unsaturation by virtue of the addition of the phosphorus atom of the phosphorus-containing reactant to the doubly bonded methylene groups. The nature of the quinodimethane is such that any hydrogen atoms which may be present in the molecule remain intact, that is, they do not become substituted with a phosphorus-containing radical. Thus, when p-quinodimethane is reacted with phosphorus trichloride as described herein, there is no evolution of HCl from the reaction mixture, the primary reaction involved in the process of this invention being one of addition to the quinodimethane rather than of substitution. The fact that the process herein described proceeds to yield a polymer product having carbon and phosphorus as the main substituents of the backbone of the polmyer and that essentially no substitution of any of the hydrogen atoms of the quinodimethane take place is unexpected.

The hydrolysis of the polymer takes place in the presence of atmospheric moisture. Other sources of water may, of course, be employed.

It is also possible to dechlorinate the polymer prepared in the absence of oxygen, such as by drying the polymer under vacuum, and to then react the polymer with oxygen, thereby obtaining the same polymer prepared by hydrolysis and by polymerization in the presence of oxygen.

In regard to the use of phosphorus pentahalides, such as phosphorus pentachloride, it is noted that such compounds exist in an equilibrium mixture of phosphorus pentachloride, phosphorus trichloride and chlorine. As such, chlorination of the polymer may also take place when the chlorine enters into a substitution reaction with a hydrogen atom of the hydrocarbon nuclei. It has also been observed that phosphorus pentahalides function as a telogen. Thus, when phosphorus pentahalide is employed three reactions take place simultaneously to produce products of the general formula:

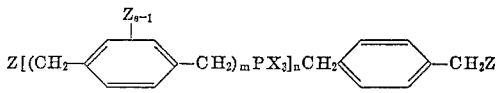

where Z is X or $PX_4$; and X, $m$ and $n$ are shown above and $s$ has an average value of from 1 to 2.

The theory and typical reaction mechanism advanced in explaining the reaction should not be construed as unnecessarily limiting thereto and may not be the only explanation for the reactions and products produced. The essence of the process resides in the interaction of certain reactants to the reaction zone which produces the phosphorus-containing polymeric products of this invention under appropriate conditions of reaction.

The process of this invention may be carried out in the presence or absence of a catalyst, although good yields of desired phosphorus-containing polymer are generally obtained without the addition of a catalyst. Suitable catalysts comprise those of the peroxy type such as trichloroacetyl peroxide; Friedel-Crafts type catalysts such as aluminum chloride and boron trifluoride; and metal iodides such as sodium iodide, aluminum iodide, and nickel iodide. When a catalyst is used, it is preferably employed in an amount of between about 0.0001 and about 0.01 mole per mole of quinodimethane monomer.

The proportions of reactants may be varied over a relatively wide range without departing from the scope of this invention. Thus, the mole ratio of phosphorus-containing reactant to quinodimethane may be between about 0.5 and about 25, but it is preferred to use between about 1 and about 15 moles of the phosphorus-containing reactant per mole of quinodimethane. It is particularly preferred to employ a molar excess of the phosphorus-containing reactant with respect to the concentration of the quinodimethane employed.

The quinodimethane and phosphorus-containing compound are generally interacted at a temperature below 50° C. which temperature may be as low as —120° C. The preferred upper temperature is 30° C. As indicated above, the quinodimethanes used as a monomer in the process of this invention tend to homopolymerize rapidly at temperatures above −45° C. even in the absence of a polymerization initiator. Thus, it is particularly preferred to contact the reactants at a temperature which is preferably below −45° C. inasmuch as the competing homopolymerization of the quinodimethane is thereby kept at a minimum.

Although it has been found to be preferred to contact the quinodimethane with at least equimolar amounts of the phosphorus-containing reactant at temperatures from about −120° C. to about 50° C., it is particularly recommended that at least equimolar amounts of these reactants be used when operating at a temperature above −45° C. Thus, for example, when p-xylene is pyrolyzed under the aforesaid conditions and the hot vapors of p-quinodimethane thereby produced are quenched rapidly at a temperature between about −45° C. and about 50° C., p-quinodimethane is brought into contact with at least an equimolar amount of phosphorus-containing compound, and the quenching and polymerization steps are carried out substantially simultaneously.

The process of the present invention may be conducted in the vapor phase or the liquid phase and either under adiabatic or isothermal conditions. It has been found that the process is more easily controlled, more convenient to operate and that a more uniform polymer is obtained by interacting the quinodimethane and phosphorus-containing compound in solution in a suitable liquid medium and that optimum yields of desired product are obtained when intimate contact is maintained between the reactants. Any of the above-mentioned liquids such as toluene, acetone, hexane, etc., which may be used for quenching of the hot vapor of quinodimethane also may be employed as the liquid in which the presently described polymerization reaction is carried out. It is pointed out that when the reaction is carried out in a hydrocarbon liquid such as toluene or hexane, that the formation of the novel polymers of this invention predominates over any reaction between such a solvent and the phosphorus-containing reactant such as phosphorus trichloride.

When operating at temperatures above −45° C., it is particularly advantageous to charge the reaction zone with a solution of the phosphorus-containing reactant and to subsequently add a solution of the quinodimethane thereto while bubbling oxygen through the reaction mixture if the reaction is carried out in the presence of oxygen. By proper choice of solvents, it is possible to employ this procedure under conditions such that the quinodimethane solvent is continuously distilled from the reaction zone, thereby making it possible to add relatively large amounts of quinodimethane without a large dilution effect. According to this procedure, the phosphorus-containing reactant is dissolved in a relatively high boiling solvent such as toluene and the quinodimethane is dissolved in a lower boiling solvent such as propane. The quinodimethane solution is maintained at a temperature of about −80° C., for example, and is added to the toluene solution of the phosphorus-containing reactant which may be at a temperature as high as 50° C. or higher. As the cold solution of quinodimethane is added to the warmer toluene solution, the quinodimethane solvent is vaporized and withdrawn from the reaction zone. This provides an efficient way of carrying out the process of this invention to produce high yields of phosphorus-containing polymers, and is especially recommended when operating at temperatures above −45° C.

The process of this invention is preferably carried out under conditions such that intimate contact between the reactants is realized. This may be achieved by agitation of the reaction mixture and/or by spraying a solution of the quinodimethane and phosphorus-containing compound as a mist into a chamber. If the reaction is carried out in the presence of oxygen, the chamber may be filled with oxygen, or may be added by bubbling oxygen through a porous ceramic disc immersed in the solution containing the quinodimethane and phosphorus-containing compounds at a rate sufficient to convert the solution to a bed of tiny oxygen or air bubbles. The air or oxygen, if added, is generally introduced into such a solution at a rate of between about 0.1 and about 1 cubic foot per minute.

Agitation of the reaction mixture which also is helpful in promoting better contact between the reactants, is particularly recommended when it is desired to incorporate maximum amounts of phosphorus into the polymer product. Agitation may be achieved by mechanical stirring using a reciprocating blade of a propeller, by shaking the reaction vessel, by the turbulence caused by bubbling oxygen or other gases through the reaction medium, or by any other such conventional methods.

Generally, the polymerization of the quinodimethane, and phosphorus-containing reactant is carried out at atmospheric pressure, although higher and lower pressures may be employed without departing from the scope of this invention. Thus, for example, the reaction zone may be pressured with air or oxygen and/or with an inert gas such as nitrogen up to about 1,000 pounds per square inch gage or higher.

The process of the present invention is readily adapted to batchwise or continuous operation. The over-all reaction period may vary over relatively wide limits such as between about one minute and about 300 hours but usually the herein described process is carried out over a period from about ½ hour to about 48 hours. Generally, the novel polymer begins to form as soon as the reactants are contacted but substantial quantities are not collected until after about one-half hour has elapsed.

As indicated above, a preferred embodiment of the process of this invention leads to the production of a novel polymer having a phosphonyl group each of two valences of which are involved in bonds to the carbon of a methylene group which in turn is bonded to an aromatically unsaturated nucleus which may be formed by carrying out the polymerization in the presence of oxygen or forming an initial polymer and then adding oxygen. Thus, these polymers contain the recurring unit

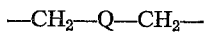

and the unit

wherein Q is an aromatically unsaturated nucleus having the same cyclic skeleton and nuclear substituents as the quinodimethane starting material and Y is as defined for structure (1) above. More specifically, —Q— is a cyclic nucleus containing at least one aromatically unsaturated six-membered ring to which the adjoining —CH$_2$— groups of the polymer backbone are preferably bonded at nuclear carbon atoms which are in the 1 and 4 position to each other. The —Q— radical is preferably selected from the group consisting of a benzene nucleus, a naphthalene nucleus and an aromatically unsaturated heterocyclic nucleus containing at least one heteronitrogen atom, the nitrogen atom or atoms being vicinal only to nuclear carbon atoms, and the nuclear substitution products of the foregoing members with normally gaseous halogens and methyl groups. It is to be understood that the phosphonyl groups and the —CH$_2$—Q—CH$_2$— group may be present as alternating units, or they may be distributed in a random fashion throughout the polymer chain.

The particularly preferred polymer of this invention is that containing a phosphonyl group, i.e.,

bonded to a benzene nucleus through the carbon atom of a methylene group and contains

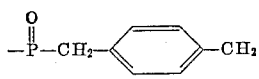

as the basic repeating structure. One method for preparing this polymer is as described herein by interacting p-quinodimethane with oxygen and inorganic trivalent phosphorus halides and compounds from which these trivalent phosphorus halide compounds are easily derived, such as from pentavalent phosphorus halides and other compounds which exist in equilibrium with trivalent phosphorus compounds. Another method is to react p-quinodimethane and a phosphorus compound of the same classes in the absence of oxygen during the polymerization step and to subsequently react the polymer with water.

It has been found that the novel phosphorus-containing polymers of this invention contain between about 0.01 and about 20 percent phosphorus, and that those containing at least 5 percent phosphorus are preferred. The preferred polymers are obtained by employing a large excess of the phosphorus compound with respect to the concentration of quinodimethane present, and by employing reaction conditions such that intimate contact between the reactants is obtained. The molecular weight of the preferred polymers of this invention ranges from about 200 to 1,000,000.

The structure of the phosphorus-containing polymers of this invention is adequately determined by percent composition analysis and by infra-red analysis. The polymers are stable to thermal degradation at temperatures as high as about 300° C. Generally, it has been observed that when the solid products are heated to a sufficiently high temperature such as 400° C., they break down into smaller units and that no sharp melting point is observed at or below the decomposition temperature.

The polymers which contain a phosphonyl halide group are useful as such or they may be used as intermediates in the preparation of other novel and useful phosphorus-containing polymers. Thus, for example, the polymers having the unit

may be converted to polymers having a phosphonic acid group upon treatment with water. The phosphonic acid type polymers are useful as such and may be employed as ion exchange resins, for example or they may in turn be converted to other useful derivatives by reaction with alcohols, for example. The phosphonyl halide polymers also may be converted directly to esters, amines, amides, and the like by the reaction with the appropriate compounds such as alcohols according to general esterification principles.

The nature of the end group of the polymer products of this invention is relatively difficult to determine since the end group is relatively small in comparison with the rest of the polymer and, generally speaking, will depend upon the particular phosphorus-containing reactant which is employed. Thus, for example, when a phosphorus halide is employed, it is postulated without limiting the scope of this invention, however, that the end group is halogen.

The following examples are offered as a better understanding of the present invention and are not to be construed as unnecessarily limiting thereto.

*Example 1*

This example illustrates the preparation of p-quinodimethane monomer.

p-Xylene vapor at 5 mm. mercury pressure and preheated to 700° C. was passed through a glass pyrolysis tube of 2.5 cm. diameter and 30 cm. in length at such a velocity that the average contact time was 0.05 second and heated to a pyrolysis temperature of 1000° C. The pyrolyzed vapors were passed directly to the top of a six liter, 3 necked glass flask which contained 3.8 liters of a chloroform-carbon tetrachloride mixture (1:1 by volume) and were then cooled in a bath of solid carbon dioxide-acetones to a temperature of −80° C. The chloroform-carbon tetrachloride mixture was continuously agitated to prevent localized heating. The liquid remained transparent for about two hours until the saturation limit was reached and then became opaque as solid p-xylene precipitated. The flask was disconnected from the train at the end of the run and the solid precipitate containing p-xylene was removed by filtration.

To prove that the mother liquor contained p-quinodimethane, a portion of it was added at −80° C. to a solution of chloroform-carbon tetrachloride containing an excess of iodine. The mixture was allowed to warm to room temperature with occasional shaking but did not change in appearance. The excess iodine was neutralized with aqueous sodium thiosulfate and the organic liquid was washed with water to remove all traces of inorganic solids. The chloroform and carbon tetrachloride were removed under vacuum and the dry residue was recrystallized from methanol to give a light brown crystalline compound having a melting point of 176°–177° C. and 70.9 percent iodine. This corresponds to the reported melting point of 1,4-di-iodomethylbenzene, namely, 177°–178° C.

The remainder of the mother liquor containing p-quinodimethane was stored under nitrogen at a temperature of −80° C. until it was desired to react it as described herein to form the novel phosphorus-containing polymers of the present invention.

p-Quinodimethane is similarly prepared in acetone, hexane, toluene and any of the other liquids set forth hereinabove as being suitable for quenching of the pyrolyzed vapor.

*Example 2*

This example illustrates the preparation of 2-methyl-p-quinodimethane.

Pseudocumene vapor, at 5 mm. Hg pressure and preheated to 600° C., is led through the pyrolysis tube of Example 1 at such a velocity that the average contact time is 0.08 second and heated to a pyrolysis temperature of 900° C. The pyrolyzed vapors are passed directly to the top of the condenser flask of Example 1, containing 3.8 liters of acetone which is cooled in a bath of Dry Ice-acetone to a temperature of −60° C. The acetone in the condenser flask is continuously agitated to prevent localized heating. A deposit of polymer is rapidly formed on the uncooled upper surface of the flask and on the upper portion of the agitator. The liquid itself remains transparent for about two hours until the saturation limit is reached and then becomes opaque as solid pseudocumene precipitates out of solution, the precipitate being removed by filtration. The mother liquor contains dissolved 2-methyl-p-quinodimethane and is stored, as such, at a temperature which is preferably −80° C. or below.

*Example 3*

This example illustrates the preparation of 1,4-napthaquinodimethane.

1,4-dimethyl naphthalene vapor, at 4 mm. Hg pressure and preheated to 600° C. is led through the pyrolysis tube of Example 1 at such a velocity that the average contact time is 0.04 second and heated to a pyrolysis temperature of 975° C. The pyrolysis vapors are passed directly to the top of the condenser flask of Example 1, containing 3.8 liters of hexane which is cooled in a bath of Dry Ice-acetone to a temperature of −60° C. The hexane solution is continuously agitated to prevent localized heating. A deposit of polymer is rapidly formed on the uncooled upper surface of the flask and on the upper portion of the agitator. The liquid itself remains transparent for about 2½ hours until the saturation limit is reached and then becomes opaque as solid 1,4-dimethyl naphthalene precipitates out of solution, which precipitate is removed by filtration. The mother liquor contains dissolved 1,4-naphthaquinodimethane and is stored, as such, at a temperature which is preferably below −60° C.

*Example 4*

This example illustrates the preparation of 2-fluoro-p-quinodimethane.

2-fluoro-p-xylene, at 6 mm. Hg pressure and preheated to 500° C. is led through the pyrolysis tube of Example 1 at such a velocity that the average contact time is 0.06 second and heated to a pyrolysis temperature of 950° C. The pyrolyzed vapors are passed directly to the top of the condenser flask of Example 1, containing 3.8 liters of toluene which is cooled in a bath of Dry Ice-acetone to a temperature of −80° C. The toluene solution is continuously agitated to prevent localized heating. A deposit of polymer is rapidly formed on the uncooled upper surface of the flask and on the upper portion of the agitator. The liquid itself remains transparent for about 4 hours until the saturation limit is reached and then becomes opaque as solid 2-fluoro-p-xylene precipitates out of solution, which precipitate is removed by filtration. The mother liquor contains 2-fluoro-p-quinodimethane which is preferably stored at a temperature of −80° C.

*Example 5*

This example illustrates the preparation of 2-chloro-p-quinodimethane.

2-chloro-p-xylene at 2.3 mm. mercury pressure and preheated to 500° C. is led through the pyrolysis tube of Example 1 at such a velocity that the average contact time is 0.006 second and heated to a pyrolysis temperature of 1050° C. The pyrolyzed vapors are passed directly to the top of the condenser flask of Example 1 containing 3.8 liters of toluene which is cooled in a bath of Dry Ice-acetone to a temperature of −80° C. The toluene solution is continuously agitated to prevent localized heating. A deposit of polymer is rapidly formed on the uncooled upper surface of the flask and on the upper portion of the agitator. The liquid itself remains transparent for about 4 hours until the saturation point is reached and then becomes opaque as solid 2-chloro-p-xylene precipitates out of solution, which precipitate is removed by filtration of the solution. The mother liquor contains dissolved 2-chloro-p-quinodimethane and is maintained at a temperature of about −80° C. until it is to be used.

*Example 6*

This example illustrates the polymerization of p-quinodimethane, oxygen and phosphorus trichloride.

(A) To a glass flask surrounded by a Dry Ice-acetone freezing bath and containing 3 liters of toluene in which 1.5 moles of p-quinodimethane was dissolved, there were added 150 ml. of phosphorus trichloride. Oxygen was then bubbled through the solution at a rate of about 1,000 cc. per minute for 2.5 hours while maintaining the temperature of the reaction mixture at −80° C. The reaction mixture was then allowed to warm to room temperature. The solid polymeric product thereby produced was removed by filtration, washed with benzene and dried under nitrogen. Upon analysis, the product was found to contain 11.2% phosphorus and 7.25 percent chlorine which is equivalent to a mole ratio of

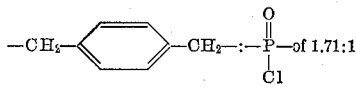

Infrared analysis of the product showed it to contain —CH$_2$—, P=O and P—Cl groups, and para-substitution on the benzene ring which showed the product to contain the recurring phosphonyl halide unit:

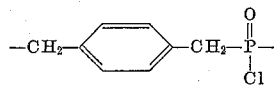

The polymeric phosphonyl halide products of this example is soluble in alcohols such as methanol, ethanol, butyl-alcohol, benzyl alcohol and ethylene glycol and forms the corresponding ester derivatives.

(B) The polymeric phosphonyl halide product of this example was found to be soluble in cold dilute sodium hydroxide solution. When the basic solution was acidified by the addition thereto of hydrochloric acid, a polymeric phosphonic acid was obtained which was found to contain 13.01% phosphorus, 2.80% chlorine and had a neutralization equivalent of 210 which is equivalent to about 8.1% hydroxyl (OH) content. These analytical values correspond to a Cl:P:OH ratio of 0.2:1:1. A sample of this polymeric acid was reacted with a 25% by weight aqueous sodium hydroxide solution at reflux temperature (about 110° C.) for 24 hours. After reacidification of the resultant product with hydrochloric acid and collection of the precipitate by filtration, the product was found to contain 12.8% phosphorus, 0.98% chlorine and had a neutralization equivalent of about 215 and a P:OH ratio of 1:1. The low chlorine content, i.e. 0.98% may be attributed to the presence of occluded sodium chloride. The fact that infrared spectrometric analysis of the product indicated the presence of only para-substitution indicated that the phosphorus was bonded to a methylene group and not to the benzene nucleus. This, in addition to the fact that the P:OH ratio did not increase with prolonged saponification, proved that each phosphorus group in both the polymeric phosphonyl halide and acid products was bonded directly to two methylene groups and that phosphorus was not bonded to the —CH$_2$— groups through an ester linkage. The phosphonic acid polymer of this example is useful as an ion exchange resin.

Other novel polymeric phosphonyl halides similar to that obtained in accordance with this example are prepared by reacting p-quinodimethane with oxygen and other inorganic phosphorus halides included within the scope of this invention such as phosphorus trifluoride, phosphorus tribromide, and phosphorus pentachloride.

*Example 7*

The phosphonyl chloride polymer (10 grams) produced in accordance with part (A) of Example 6 above was dissolved in 200 cc. of methanol at room temperature. The methanol solution was poured into a large excess of water and the polymer separated out of solution as a gum which on continued washing with fresh water, became rubbery. The rubber was dried in a vacuum oven at 35° C. for 16 hours and was found to be rubbery at room temperature, non-inflammable and possessed a high degree of adhesive to glass. It was also resistant to attack when placed in concentrated sulfuric acid. Infrared analysis of the product shows it to contain P=O, P—OCH$_3$, —CH$_2$— and phenyl groups and essentially no P—Cl linkage. Thus, when the polymeric phosphonyl halides produced as described in part (A) of Example 6 above, are treated with methanol, the corresponding polymeric phosphonic acid methyl ester is formed according to the following equation:

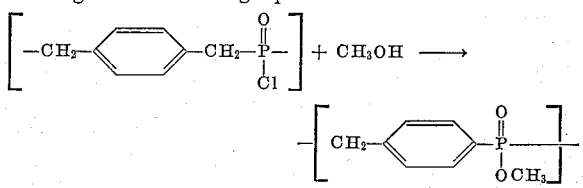

When a methanol solution containing about 15 percent by weight of the polymeric phosphonic acid methyl ester of this example is sprayed onto glass, metal and fabric surfaces at room temperature, flexible and continuous coatings are produced which adhere strongly to the surface to which the solution is applied. The coated surface is thereby rendered resistant to chemical attack when exposed to strong acids such as concentrated sulfuric acid.

This ester is insoluble in methanol and resists solution in sodium hydroxide and is thermoplastic material that softens at about 200° C. However, upon heating the polymer cross-links to a thermoset material, probably due to the formation of —P—O—P— bonds.

*Example 8*

This example illustrates the polymerization of p-quinodimethane, ethyl phosphorus dichloride and oxygen to produce a novel phosphorus-containing polymer.

To a glass flask surrounded by a Dry Ice-acetone freezing bath, and containing 500 cc. of hexane containing 200 grams of ethyl phosphorus dichloride, there are added 2.5 liters of hexane containing 0.3 mole of p-quinodimethane while bubbling oxygen through the reaction mixture at a rate of about 500 cc. per minute. The reaction is carried out at —80° C. at atmospheric pressure for about 10 hours. The product is worked up using the same procedure described in Example 6(A) above. A solid phosphorus-containing polymer is obtained in satisfactory yield.

When the other quinodimethanes of the present invention, for example, those produced in accordance with Examples 2 to 5 above, are interacted with inorganic phosphorus halides in the presence or absence of oxygen, for example, under the reaction conditions set forth hereinabove, novel and useful polymers are obtained which contain a phosphorus bonded to an aromatically unsaturated nucleus through the carbon atom of a methylene group. Thus, other typical examples of the novel phosphorus-containing polymers produced in accordance with this invention are those containing the following groups:

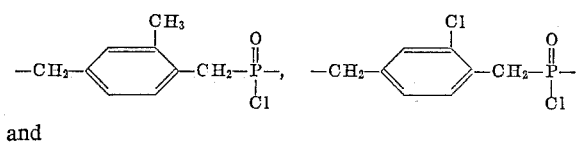

and

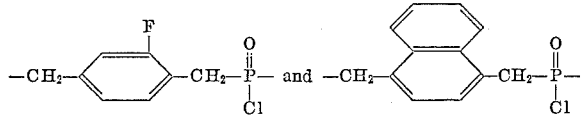

which polymers are prepared by interacting oxygen and an inorganic phosphorus chloride with 2-methyl-p-quinodimethane, 2-chloro-p-quinodimethane, 2-fluoro-p-quinodimethane, and 1,4-naphthaquinodimethane, respectively, using a procedure similar to those employed in the above examples or by the hydrolysis of the polymers prepared in the absence of oxygen. These phosphonyl halide polymers are converted to their corresponding phosphinic acid esters upon treatment with alcohols such as methanol, butanol and the like.

*Example 9*

(A) p-Xylylene-phosphorus trichloride polymer: A gas stream of p-xylene (500 g.) flowing at the rate of 0.0157 mole/min. was pyrolyzed at 980° C. and 5 mm. Hg pressure with a residence time of 0.0096 second in the reaction zone. The pyrolysate, which contained p-xylylene (29 gm., 0.27 mole), was condensed into a solution of PCl₃ (120 gm., 0.87 mole) in 4.5 liters of toluene at —78° C. The resulting solution was stored in a Dry Ice chest (approximately —70° C.) for 13 days to complete the reaction before the mixture was warmed to room temperature. The mixture was separated by filtration under nitrogen and the filter cake was washed thoroughly with hexane. The filter cake still wet with hexane contained 2.09% phosphorus and 6.3% chlorine which corresponds to a chlorine to phosphorus ratio of 2.7 to 1.

The filter cake was dried under vacuum and then exposed to atmospheric oxygen. The elemental analysis for the dry material was 10.6 phosphorus and 8.0% chlorine which corresponds to a chlorine to phosphorus ratio of 0.66 to 1. The infrared spectra of the dried and aerated product had a strong band at 8.0, showing the presence of the P=O group whereas the undried product showed only a neglible amount of this group. Accordingly, p-xylylene adds to PCl₃ to produce a phosphorus containing polymeric material that is subsequently dechlorinated under vacuum and then oxidized by atmospheric oxygen to the corresponding phosphonyl chloride. In this way p-xylylene-phosphonyl chloride polymer containing 10.6% phosphorus was obtained which corresponds to a p-xylylene to POCl ratio of 2.1 to 1. This material contained a small amount of poly-p-xylylene which was removed by dissolving the phosphorus polymer in dilute sodium hydroxide as shown in part (B).

(B) p-Xylylene-phosphonic acid polymer: A mixture of p-xylyene-phosphonyl chloride polymer, (15 gm.) obtained as shown in part (A) above, sodium hydroxide (10 gm.) and water (300 cc.) was allowed to react at 100° C. for 2 days. The mixture was cooled to room temperature and a small amount of insoluble material was removed by filtration. The polymer was precipitated from the mother liquor by acidification with dilute nitric acid. The resulting polymer was removed by filtration and dried. The final product (6.5 gm.) had a neutral equivalent of 225 and contained 14.6% phosphorus and less than 0.1% chlorine which corresponds to a p-xylylene to PO₂H ratio of 1.4 to 1.

Freshly precipitated p-xylylene-phosphonic acid polymer (0.1 gm.) was used to fill a vertical 4 inch, 5 mm. O.D. micro chromatography column. This column was washed with distilled water which flowed downward through the packing at the rate of 1 cc. per minute. A barium chloride solution (20 cc. containing 16 mg. of barium) was allowed to pass through the column followed by 20 cc. of distilled water. The combined eluate contained 6 mg. of barium, the other 10 mg. of barium having been retained by the polymer. The column was then regenerated by eluting with 5 cc. of concentrated hydrochloric acid, followed by 20 cc. of distilled water. Three milligrams of barium were recovered from the column in this manner. Similar results were obtained with FeCl₃ and CrCl₃ solutions.

*Example 10* p-Xylylene–AsCl₃ polymer: p-Xylene (500 gm.) was pyrolyzed at 1000° C. and 5 mm. Hg pressure with 0.0078 sec. residence time in the reaction zone. The pyrolysate, which contained p-xylylene (25 gm.), was condensed at —78° C. into a solution of AsCl₃ (127 gm.) in 4½ liters of heptane. The resulting solution was stored in a Dry Ice chest for 5 days before the reaction was terminated by quenching the mixture with a stream of oxygen as the solution was warmed to room temperature. An insoluble polymer was removed by filtration and washed thoroughly with heptane and then acetone to yield an amorphous polymer (22 gm.) that contained 0.2% arsenic.

*Example 11*

(A) p-Xylylene-phenylphosphorous dichloride polymer: A solution of p-xylylene (0.25 mole), and phenyl phosphorus dichloride (85 gm. 0.45 mole) in 4.5 liters heptane and 0.5 liter p-xylene was prepared at —78° C. The mixture was allowed to remain in a Dry Ice chest for 4 days and then warmed to room temperature. The polymer obtained was separated by filtration, washed with heptane and then dried to yield approximately 50 gm. of a product containing 8.98% phosphorous and 7.6% chlorine which corresponds to a p-xylylene to phosphorus to chlorine ratio of about one to one to one. Its infrared spectrum indicated that the polymer contained p-substituted p-xylylene units and P—OH bonds. From this data, it was concluded that the polymer had the following structural formula

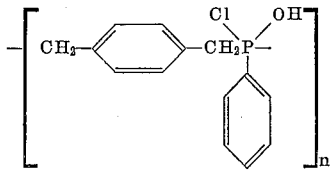

The hydroxyl group attached to phosphorus atom was formed by hydrolysis of one chlorine atom with atmospheric moisture.

(B) p-Xylylene-phenyl phosphine oxide polymer: A ten gram sample of the above polymer was digested at reflux temperature in 1 liter of acetic acid. A small amount of insoluble residue (1 gm.) was removed by filtration. The mother liquor was added to a two-fold amount of water to precipitate the polymer, which was collected by filtration, washed with water and dried to produce 7 grams of polymer. The X-ray diffraction pattern indicated that this polymer was amorphous and had one continuous halo from 4.6 A. to 4.2 A. The infrared spectrum indicates the presence of para and mono substituted aromatic groups and the P=O groups. The elemental analysis of the resulting polymer was as follows: 1.3% chlorine; 74.0% carbon; 6.2% hydrogen; 9.65% phosphorous. The inherent viscosity of the polymer in acetic acid was 0.445 which corresponds to a molecular weight of about 50,000.

This polymer softened between 200° and 250° C. and formed a clear transparent flexible sheet after being pressed at 250° C. and 1000 p.s.i.g.

Films formed from an acetic acid solution of this polymer were found to be tough and pliable. Fibers were prepared by drawing the polymer from a concentrated acetic acid solution of the polymer at 100° C.

Poly-p-xylylene phenyl phosphine oxide can also be formed from poly-p-xylene phenyl phosphorus dichloride by leaching the latter with dilute NaOH. The resulting polymer is insoluble in a dilute sodium hydroxide and can be separated easily by filtration.

*Example 12*

Phosphorus pentachloride (50 gm.) was added at −78° C. to 3.5 liters of a freshly prepared 0.03 molar solution of p-xylylene in toluene. The resulting solution was stored in a Dry Ice chest for 5 days and then warmed to room temperature. A small amount of polymer (2 gm.) was removed by filtration. The excess solvent of the mother liquor was removed under vacuum, and 37 gm. of a dark viscous oil was obtained as a residue. This was leached with hot dilute sodium hydroxide. The mixture was cooled to room temperature and then extracted with an equal volume of ethyl ether. Three phases were present and 2 gm. of insoluble material was removed by filtration before the two liquid phases were separated. The dark aqueous alkaline layer was acidified with dilute HCl to afford 10 gm. of a dark oil. This oil after settling was separated by decantation. The molecular weight of this oil was determined to be about 1100 and it contained 7.14% phosphorus and 3.1% chlorine. The infrared spectrum was consistent with a polymeric product that contained p-xylylene units, P=O and OH groups.

Ferric chloride (3 gm.) dissolved in methanol (20 cc.) was admixed with the above oil (5 gm.) dissolved in methanol (30 cc.). Water was then added to the dark clear solution until all the dark chromaphoric material was completely precipitated and the methanol mother liquor had returned to the characteristic reddish color of FeCl$_3$ in MeOH. The dark flocculant precipitate (0.9 gm.) was removed by filtration, and an excess of water was added to the clear reddish mother liquor. A pale yellow flocculant precipitate formed immediately and this was removed by filtration from the light yellow mother liquor. The solid was reslurried in methanol and recollected by filtration to afford 4.9 gm. of product. This material was insoluble in water, methanol, acetone and toluene, but soluble in acetic acid and did not melt below 300° C.

Similar results were obtained with barium chloride, silver nitrate and sodium chloride.

*Example 13* p-Xylylene-tri-ethyl phosphite polymer: p-Xylene (500 gm.) was pyrolyzed at 1010° C. and 5 mm. Hg pressure with a 0.0083 second residence time in the reaction zone. The pyrolysate, which contained p-xylylene (25 gm.), was condensed at −78° C. into a solution of triethyl phosphite (78 gm.) in 4.5 liters of heptane. The resulting solution was stored in a Dry Ice chest for 4 days where polymerization was allowed to occur almost to completion before the reaction was terminated by quenching with oxygen as the solution was warmed to room temperature. The polymer was removed by filtration and washed thoroughly with heptane and then acetone to yield an amorphous polymer (26 gm.) and 81% or 21 gm. passed through a 160 mesh screen. The product contained 0.09% phosphorus which corresponds to a ratio of p-xylylene to tri-ethyl phosphite of 330 to 1. The polymer was pressed at 400° C. and 10,000 p.s.i.g. pressure into a tough homogeneous pellet that was stable at 225° C. in air for 480 hours.

Its electrical, mechanical, and thermal properties are summarized below:

ELECTRICAL PROPERTIES (A) Volume resistivity greater than $2 \times 10^{13}$ ohms

|  | One kilocycle | 100 kilocycle |
| --- | --- | --- |
| (B) Dielectric constant | 2.08 | 1.832 |
| (C) Dissipation factor | 0.00024 | 0.00070 |

MECHANICAL PROPERTIES (A) Tensile strength _____ 3065 p.s.i.
(B) Elongation _____ Less than 0.5%.
(C) Hardness _____ Shore D63.

THERMAL PROPERTIES (A) Heat distortion point greater than 250° C.
(B) Weight loss at 225° C.

| Time, hrs.— | Total percent weight loss, percent |
| --- | --- |
| 144 | −2.8 |
| 240 | −3.5 |
| 336 | −4.0 |
| 480 | −3.5 |

*Example 14* p-Xylylene-triphenyl phosphine polymer: p-Xylene (500 gm.) was pyrolyzed at 1018° C. and 5 mm. Hg pressure with a 0.0073 second residence time in the reaction zone and the pyrolysate, which contained p-xylylene (approximately 25 gm.), was condensed at −78° C. into a solution of triphenyl phosphine (100 gm.) in 4.5 liters of toluene. The resulting solution was stored in a Dry Ice chest for 24 hours before the reaction was terminated by quenching with oxygen as the solution was warmed to room temperature. The polymer was removed by filtration and washed thoroughly with toluene and then acetone to yield an amorphous polymer (23 gm.) that was pressed at 400° C. and 10,000 p.s.i.g. pressure into a tough disc. This material was extruded at 430° C. and 8,000 p.s.i.g. to afford clear pliable fibers having a tensile strength greater than 20,000 p.s.i.g.

Example 15 p-Xylylene-tri-n-butyl phosphine polymer: p-Xylene (500 gm.) was pyrolyzed at 1000° C. and 6 mm. Hg pressure with a residence time of 0.0124 second in the reaction zone. The pyrolysate, which contained p-xylylene (approximately 25 gm.), was condensed into a solution of tri-n-butyl phosphine (50 cc.) in 4½ liters of heptane. The resulting solution was stored in a Dry Ice chest for 24 hours. The reaction was then terminated by quenching with oxygen as the solution was warmed to room temperature and an insoluble salmon pink polymer was removed by filtration and washed thoroughly with heptane and then acetone to yield an almost white, amorphous powder (21 gm.) that contained 0.1% phosphorus. This powder was pressed at 400° C. and 10,000 p.s.i.g. into a tough pellet and forms fibers having high tensile strengths.

The novel phosphorus-containing polymers of this invention have improved molding properties as compared to the quinodimethane homopolymers which is evidenced by their moldability at relatively low temperatures such as between about 100° C. and about 300° C. These polymers can be molded by conventional extrusion and transfer molding techniques. They also can be compression molded between about 1,000 and about 10,000 pounds per square inch within the aforesaid temperature range. Among the valuable end products which are fabricated from these polymers are gaskets, tubing, tires, and flexible hoses.

As previously indicated the polymers of the present invention find utility as protective coatings and are applied as such from solution without requiring the addition thereto of a dispersion agent. Among the solvents which are useful for this purpose are the alcohols such as methanol, ethanol, butanol, and the like, the ether alcohols such as methoxy ethanol and ethoxy ethanol and acetic acid. When a major proportion of polymer is present, the solution is in the form of a viscous material or gel. The quantity of solvent which is employed will depend upon the particular use for which this solution is intended. In most cases the concentration of polymer will be maintained between about 1 and about 40% by weight. In the instance where the solution is to be applied by spraying techniques or by other techniques which require low viscosity, the concentration of the polymer is maintained between about 1 and about 20 weight percent. Generally speaking, the polymers exhibit good adhesion properties to metal surfaces and glass and thus, a primer coating is generally not required. The polymers of this invention also find utility as fire-proofing agents for textiles, as cementing agents and as wire-coatings.

The polymers of this invention which contain the grouping

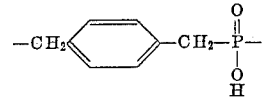

related groupings and alkali metal salts thereof act as detergents and contain a "built in" bluing since they fluoresce pale blue when irradiated with ultra violet light.

This invention insofar as it relates to a process of interacting a quinodimethane and phosphorus-containing compound may be carried out in single or multiple zones and stages to produce novel and useful phosphorus-containing polymers. Various modifications and alterations of procedure and operating conditions may become apparent to those skilled in the art without departing from the scope of this invention.

I claim:

A process which comprises interacting p-quinodimethane with phosphorus trichloride at a temperature below 30° C. in an organic liquid medium to produce a phosphorus containing polymer having a benzene nucleus bonded to the phosphorus atom through the carbon atom of a methylene group.

References Cited in the file of this patent

UNITED STATES PATENTS

| | | |
|---|---|---|
| 2,500,247 | Garwood et al. | Mar. 14, 1950 |
| 2,777,005 | Errede et al. | Jan. 8, 1957 |

OTHER REFERENCES

Auspos et al.: Journal of Polymer Science, vol. 15, pages 9–17, 1955.

Partington: "Textbook of Inorganic Chemistry," page 368, Macmillan & Co., London (1953).

Remy: "Treatise on Inorganic Chemistry," page 4, Elsevier Publishing Co., New York (1956).

Mann et al.: J. Chem. Soc., 1954, pp. 32–37.

Lyon et al.: J. Chem. Soc., 1947, pp. 662–670.

Lyon et al.: J. Chem. Soc., 1945, pp. 30–34.

UNITED STATES PATENT OFFICE
CERTIFICATE OF CORRECTION

Patent No. 3,146,211                                     August 25, 1964

Louis A. Errede

It is hereby certified that error appears in the above numbered patent requiring correction and that the said Letters Patent should read as corrected below.

Column 7, line 43, for "$PX_2$" read -- $PX_3$ --; column 14, line 59, for "adhesive" read -- adhesion --.

Signed and sealed this 2nd day of February 1965.

(SEAL)
Attest:

ERNEST W. SWIDER                                  EDWARD J. BRENNER
Attesting Officer                                      Commissioner of Patents